(12) United States Patent
Ji et al.

(10) Patent No.: US 8,306,224 B2
(45) Date of Patent: Nov. 6, 2012

(54) TRANSMITTER APPARATUS FOR MPEG-4 IPMP EXTENDED ISMA MEDIA STREAM

(75) Inventors: Ming Ji, Singapore (SG); Jing Liu, Singapore (SG); Sheng Mei Shen, Singapore (SG); Takanori Senoh, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1359 days.

(21) Appl. No.: 10/555,340

(22) PCT Filed: Apr. 30, 2004

(86) PCT No.: PCT/JP2004/006288
§ 371 (c)(1),
(2), (4) Date: May 25, 2006

(87) PCT Pub. No.: WO2004/100442
PCT Pub. Date: Nov. 18, 2004

(65) Prior Publication Data
US 2006/0274895 A1 Dec. 7, 2006

(30) Foreign Application Priority Data
May 9, 2003 (JP) ................ P2003-131372

(51) Int. Cl.
*H04N 7/167* (2006.01)
(52) U.S. Cl. ........ 380/217; 380/210; 380/239; 713/160; 713/168; 713/187
(58) Field of Classification Search .................. 380/217
See application file for complete search history.

(56) References Cited

U.S. PATENT DOCUMENTS

| | | | | |
|---|---|---|---|---|
| 7,099,491 | B2 * | 8/2006 | Takaku | 382/100 |
| 7,233,948 | B1 * | 6/2007 | Shamoon et al. | 707/9 |
| 2002/0035725 | A1 | 3/2002 | Ando | |
| 2002/0156712 | A1 * | 10/2002 | Rambhia | 705/36 |
| 2004/0054892 | A1 | 3/2004 | Ji et al. | |
| 2004/0236956 | A1 * | 11/2004 | Shen et al. | 713/193 |
| 2005/0015707 | A1 | 1/2005 | Ji et al. | |
| 2005/0204067 | A1 | 9/2005 | Ji et al. | |

FOREIGN PATENT DOCUMENTS

| | | |
|---|---|---|
| CA | 2425741 | 9/1999 |
| JP | 2002-84516 | 3/2002 |
| JP | 2003-78519 | 3/2003 |
| WO | 99/48296 | 9/1999 |

(Continued)

OTHER PUBLICATIONS

"ISMA—Releases Content Protection Specification for Peer Review", Buisness Wire, Mar. 31, 2003, pp. 1-2.*

(Continued)

*Primary Examiner* — Shewaye Gelagay
(74) *Attorney, Agent, or Firm* — Greenblum & Bernstein, P.L.C.

(57) ABSTRACT

A device which transmits an ISMA media stream subjected to MPEG-4 IPMP extension. An ISMA media stream having an ISMA header and including contents as a payload is constituted, an IPMP tool list descriptor representing, as a tool required for processing of the contents, at least one tool selected from a group including an IPMP tool, an ISMA Cryp decryption tool, and a key management system (KMS) tool is buried in the media stream, and the ISMA media stream is transmitted.

1 Claim, 8 Drawing Sheets

FOREIGN PATENT DOCUMENTS

WO 03/021965 3/2003

OTHER PUBLICATIONS

Herpel et al. "MPEG-4 Elementary stream management" 2000, Elsevier Science, pp. 299-320.*

Rambhia "Coding of Moving Pictures and Audio" International Organization for Standardization, Jul. 2001, pp. 1-38.*

ISMA 1.0 Encryption and Authentication Version 1, Oct. 2003, pp. 1-46.*

King et al., "MPEG-4 IPMP Extensions," Lecture Notes in Computer Science, vol. 2320, pp. 126-140 (May 22, 2002).

U.S. Appl. No. 10/555,339 to Ji et al., filed Nov. 3, 2005.

"Internet Streaming Media Alliance Task Force: Digital Rights Management Market Requirements Document", 3GPP Draft; ISMA_DRM_MRD_DRAFT2, 3rd Generation Partnership Project (3GPP), Mobile Competence Center ; 650, Route Des Lucioles ; F-06921 Sophia-Antipolis Cedex ; France, vol. tsg_sa\WG4_CODEC\TSGS4_23\Docs, No. Montreal, Canada; 20021004, Sep. 26, 2002, XP050285436.

King et al., "MPEG-4 IPMP Extensions", Lecture Notes in Computer Science, Springer Verlag, Berlin; DE, vol. 2320, May 22, 2002, pp. 126-140, XP002981823.

R. Koenen, Intellectual Property Management and Protection in MPEG Standards', Internet Citation, Jun. 20, 2002, XP002958960.

Ji et al., "MPEG-4 IPMP Extension for Interoperable Protection of Multimedia Content," EURASIP Journal on Applied Signal Processing, vol. 14, pp. 2201-2213 (2004).

Internet Streaming Media Alliance (ISMA), ISMA 1.0 Encryption and Authentication, Version 1.0, Contribution Registration No. TD00037, (Unapproved Draft), Oct. 2003.

* cited by examiner

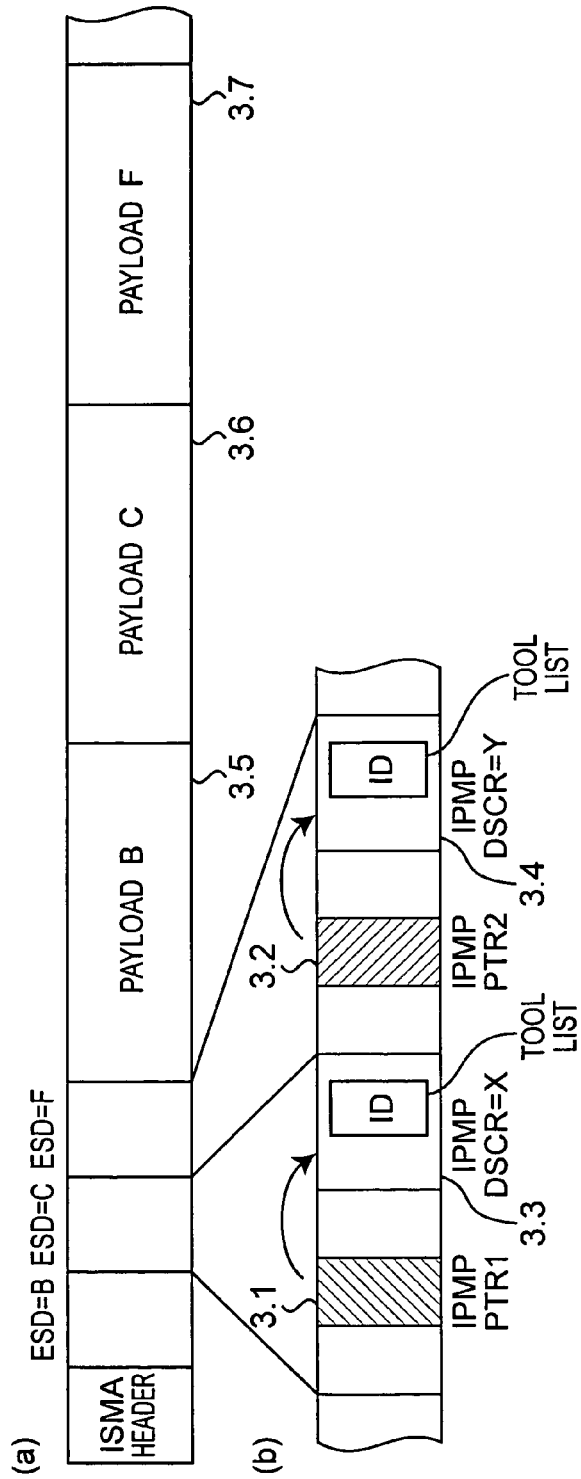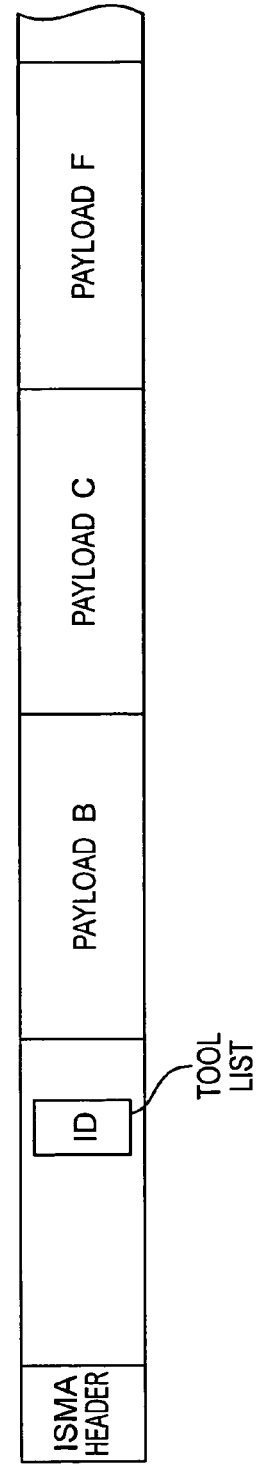
Fig.4
Fig.5

TRANSMITTER APPARATUS FOR MPEG-4 IPMP EXTENDED ISMA MEDIA STREAM

TECHNICAL FIELD

The present invention relates to MPEG-4 IPMP extension compatible with an ISMA protection framework.

BACKGROUND ART

In recent years, distribution of video data or audio data through the Internet is expected more and more in medium contents distribution business. A large number of standardization groups have made considerable efforts to provide a solution to the problem. One of these groups is Internet Streaming Media Alliance (ISMA). This group is working on the problem by publishing a framework for use of an interavailable existing open standard which can be used by a vender to construct an interavailable video or audio system used in an IP framework or the Internet. The specification supposes use of the existing MPEG technology and mainly focuses on the MPEG-4 technology (note that the future adoption or change may include the MPEG-2 and MPEG-7 technologies) at this time.

The ISMA or an encryption framework, i.e., ISMA Cryp for an ISMA media stream is defined. This framework can be extended to new medium and encoding, and can be upgraded for new encryption conversion, and can be used in various key management systems, a security management system, and a digital rights management (DRM) system. The framework defines encryption of a default of media streaming and certification of a medium message to the ISMA standards. FIG. 1 is a diagram showing an architecture of ISMA Crpt protection on an ISMA framework.

As is declared by the ISMA, two types of receivers are targeted. More specifically, the receivers are ISMA-only receivers and MPEG system-capable receivers. In this case, the "ISMA-only receivers" are not receivers which are compatible with an MPEG-4 system, i.e., receivers which cannot process signals in an MPEG-4 system and cannot process control (elementary) streams attachable to an arbitrary MPEG-4 (elementary) media stream. In contrast to this, the "MPEG system-capable receivers" can process MPEG-4 system layer information together with information related to the ISMA. Interavailability to the MPEG system-capable receivers can be achieved by MPEG IOD (Initial Object Description) including at least an MPEG system signal at the minimum level. The IOD is included as a binary SDP (Session Description Protocol) attribute, i.e., SDP IOD.

The ISMA Crypt can also be used in both the types of receivers. The ISMA Cryp extends binary IOD in an SDP message. New signaling (notification) provides asymmetry rather than redundancy detected in the ISMA signaling. This provides "minimum" and "basic" notification parameters of the SDP IOD to maximize the interavailability to MPEG-4 IPMP systems of the receivers.

However, current ISMA Cryp extended and defined for the IOD is not perfect and is not matched with the latest MPEG-4 IPMP extension standards. As a result, the ISMA stream may not correctly recognized by an MPEG-4 IPMP extension compatible receiver. For example, the ISMA Cryp standards define that the presence of an IPMP_Descriptor in the IOD is used to show ISMA Cryp protection. However, according to the MPEG-4 IPMP extension, a tool list descriptor must be present in the IOD when the IPMP protection is established. These match and mismatch may spoil the interavailability of the ISMA framework to the MPEG-4 IPMP extension compatible receiver.

SUMMARY OF THE INVENTION

The present invention will solve the following problems.

The ISMA Crypt standards define notification of ISMA Cryp protection using the MPEG-4 IPMP through extension of the IOD in the SDP. The presence of the IPMP_Descriptor notifies a receiver that the media stream is protected. In MPEG IPMP incompatible receivers, thereafter, holders of streams can process the streams by using appropriate methods (for example, the streams are simply neglected). However, the MPEG-4 IPMP extension standards define that a tool list descriptor is present in the IOD to show IPMP protection. The standards do not assure the presence of the IPMP descriptor in the IOD for IPMP protection. For this reason, the notification method (signaling method) defined by the ISMA Cryp may not correctly detect a protection mechanism of a media stream which has a tool list descriptor but do not have an IPMP_descriptor.

Furthermore, in order to make it possible to receive data (for example, encryption information and KMS configuration attached to IPMP data) related to the ISMA through an MPEG-4 IPMP extension compatible receiver, the ISMA Cryp standards extend an IPMP descriptor in an IOD by an ISMA Cryp descriptor (ISMA Cryp_Descriptor) defined on the basis of the IPMP standards. However, due to the rapid advance of the MPEG-4 IPMP standards, the grammar of the IDO is changed into the grammar of the old version on which the ISMA Cryp standards bases. In this manner, data related to the ISMA and stored in an IPMP context may disadvantageously not be recognized by a receiver compatible with the latest MPEG-4 IPMP extension standards. In order to hold matching to the latest MPEG-4 IPMP extension standards while minimizing the change of parameters of ISMA which have already defined, a new mechanism which can store data related to the ISMA in the current MPEG-4 IPMP extension standards is required. This mechanism is compatible with the MPEG-4 IPMP extension standards of a previous version.

In order to solve the problem of the signaling, according to the present invention, a signaling mechanism which notifies a receiver of the presence of ISMA Cryp protection in an MPEG initial object descriptor (IOD) is defined. A tool list and an IPMP descriptor are used to notify a receiver of protection. This means is compatible with the latest MPEG-4 IPMP extension standards to realize maximum interavailability to an MPEG system-capable ISMA receiver. This provides a flexible method which identifies a tool which is necessary to reproduce contents.

In a device which transmits an ISMA media stream subjected to MPEG-4 IPMP extension according to the present invention, an ISMA media stream having an ISMA header and including contents as a payload is constituted, a tool list descriptor representing at least one tool selected from a group including, as a tool required for processing the contents, an IPMP tool, an ISMA Cryp decryption tool, a key management system (KMS) tool is buried in the media stream, and the ISMA media stream is transmitted.

The IPMP tool mentioned here means an IPMP (intellectual Property Management and Protection) tool in the MPEG-4. For example, the IPMP tool is a module which executes IPMP functions such as certification, encryption/decryption, and electronic watermark functions of contents in a stream. This IPMP tool may be buried in the stream, or may be acquired by downloading the IPMP tool from a predetermined server through a network as needed independently of the stream. The IPMP tool may be externally acquired by a method other than the methods described above.

The ISMA Cryp decryption tool is a module which decrypts contents encrypted by encryption standards ISMA Cryp in the ISMA.

Furthermore, the key management system (KMS) took is a tool which generates/updates/discontinues an encryption key for protecting contents and conforms to methods respectively determined for contents protection schemes. The key management system tool especially targets a tool corresponding to a key management system regulated in the ISMA. For example, the key management system tool is a module which, when keys are replaced depending on predetermined data lengths in encryption, replaces the keys in decryption by the same manner as that in the encryption.

The tool list descriptor may be buried in the IOD of the ISMA media stream.

In a device which transmits an ISMA media stream subjected to MPEG-4 IPMP extension according to the present invention, an ISMA media stream has an ISMA header and includes contents as a payload, an IPMP descriptor representing at least one tool selected from a group including, as a tool required to process the contents, an IPMP tool, an ISMA Cryp decryption tool, and a key management system (KMS) tool is buried in the media stream, and the ISMA media stream is transmitted.

Furthermore, an IPMP descriptor pointer indicating the IPMP descriptor is preferably buried in the ISMA media stream. Since the use of the pointer makes it possible to independently secure a reference region, the device can easily cope with a change in size of the IPMP descriptor by extension. The IPMP descriptor pointer may be buried in an ES descriptor of the ISMA media stream.

Furthermore, in addition to the IPMP descriptor, an IPMP tool list descriptor representing at least one tool of the tools is preferably buried in the ISMA media stream.

An ISMA Cryp parameter using the ISMA Cryp description tool may be stored in ISMA Cryp_Data extended from IPMP_Data_Base Class. Furthermore, the ISMA Cryp_Data may be stored in the IPMP descriptor stored in OD of the IPMP media stream. In addition, the ISMA Cryp_Data may be stored in an IPMP_Message stored in the IPMP media stream.

The IOD and the OD are constructed in the ISMA framework. When the IPMP tool list descriptor is buried in the IOD, and when ISMA Crypt protection is present, the IPMP descriptor pointer and the IPMP descriptor are buried in the IOD and the OD.

The IOD and the OD are transmitted to an ISMA receiver which understands the MPEG-4 system by SDP IOD signaling. The receiver analyzes the IOD and the OD. When the IPMP tool is detected, the receiver recognizes that the ISMA Cryp protection is present. When the IPMP descriptor pointer and the IPMP descriptor are detected, the receiver can know a specific stream and a specific tool which protects the specific stream.

When the stream is protected by the ISMA Cryp in the ISMA frame, an ISMA Cryp parameter (for example, an encryption identifier) can be stored in the ISMA Cryp_Data, and can be arranged in the IPMP descriptor or the IPMP stream. Storage of the parameter is included in the MPEG-4 IPMP extension standards.

ON the receiver side, parameters related to the ISMA Cryp can be extracted from the IPMP descriptor or the IPMP stream by the MPEG-4 IPMP extension compatible method. These parameters can be used to constitute an ISMA Cryp description tool.

With adoption of the present invention, an ISMA protection framework can realize the interavailability to the MPEG-4 IPMP extension compatible receiver.

The present invention notifies the receiver of ISMA Cryp protection by using a tool list in the IOD and an IPMP description in the OD. In this manner, the signaling method can be made flexible, and the latest MPEG-4 IPMP extension standards can be made apparently compatible. For this reason, interavailability of the MPEG system-capable ISMA receiver can be achieved.

According to the present invention, ISMA Cryp_Data extended from the IPMP_Data_Base Class is generated. The invented ISMA Cryp_Data can be used to store ISMA Cryp parameters, and can be substantially stored in any one of the IPMP descriptor and the IPMP stream. The storage of the ISMA Cryp parameters conforms to MPEG-4 IPMP extension.

BRIEF DESCRIPTION OF THE DRAWINGS

The present invention will become readily understood from the following description of preferred embodiments thereof made with reference to the accompanying drawings, in which like parts are designated by like reference numeral and in which:

FIG. 4($a$) is a schematic diagram showing a structure of an ISMA stream shown in FIG. 3, and FIG. 4($b$) is an enlarged schematic diagram showing the structure in an ES descriptor in FIG. 4($a$);

FIG. 5 is a schematic diagram showing a structure of an ISMA stream which does not include an IPMP descriptor pointer;

DESCRIPTION OF PREFERED EMBODIMENTS

1. IPMP Extension Signaling

The current ISMA Cryp supports SDP IOD signaling to an ISMA-only MPEG receiver and an MPEG receiver. The ISMA-only receiver receives only SDP FMTP signaling parameters. However, the SDP IOD must notify an arbitrary MPEG receiver that a stream has ISMA Cryp protection (minimum IPMP signaling). A KMS may notify the receiver of the ISMA Cryp signaling by using only the IPMP signaling in the SDP IOD (basic IPMP signaling).

This specification provides a grammar compatible with MPEG-4 IPMP extension. The ISMA Cryp can easily realize compatibility with the MPEG-4 IPMP extension with the least effort to provide more flexible protection means.

Minimum IPMP-X Signaling

IPMP extension defines an IPMP tool list descriptor in an IOD. The IPMP tool list descriptor specifies a list of IPMP tools required for the subsequent processing. According to the MPEG-4 IPMP extension, when IPMP protection is made, the tool list descriptor must be present in the IOD. With respect to the first IPMP-X signaling, in order to achieve the object, it is proposed to use the IPMP tool list descriptor in the IOD in place of an IPMP descriptor.

According to a current ISMA Cryp specification which regulates encryption and KMS information transfer, at least two tools must be present in the MPEG IPMP tool list descriptor. The first tool is a KMS tool, and the second tool is a second ISMA description tool. The presence of the ISMA Cryp tool in the MPEG IPMP tool list notifies a receiver of ISMA Cryp protection.

An example of a tool list descriptor obtained by the ISMA Cryp tool is shown in Table 1.

TABLE 1

| | | IPMP_ToolListDescriptor | |
|---|---|---|---|
| 1 | 8 | IPMP_ToolListDescTag | 0x60 |
| 2 | 16 | Descriptor size | |
| | | IPMP_Tool | |
| 3 | 8 | IPMP_ToolTag | 0x61 |
| 4 | 16 | Descriptor Size | |
| 5 | 128 | IPMP_ToolID | Values allocated to KMS tools by service providers, respectively |
| 6 | 1 | isAltGroup | 0 |
| 7 | 1 | isParametric | 0 |
| 8 | 6 | reserved | 0b0000.00 |
| 9 | 8 | Tool URL size | |
| 10 | | Tool URL | |
| | | IPMP_Tool | |
| 11 | 8 | IPMP_ToolTag | 0x61 |
| 12 | 16 | Descriptor size | |
| 13 | 128 | IPMP_ToolID | Value allocated to ISMA decryption tool |
| 14 | 1 | isAltGroup | 0 |
| 15 | 1 | isParametric | 0 |
| 16 | 6 | reserved | 0b0000.00 |
| 17 | 8 | Tool URL size | |
| 18 | | Tool URL | |

Figure 1:
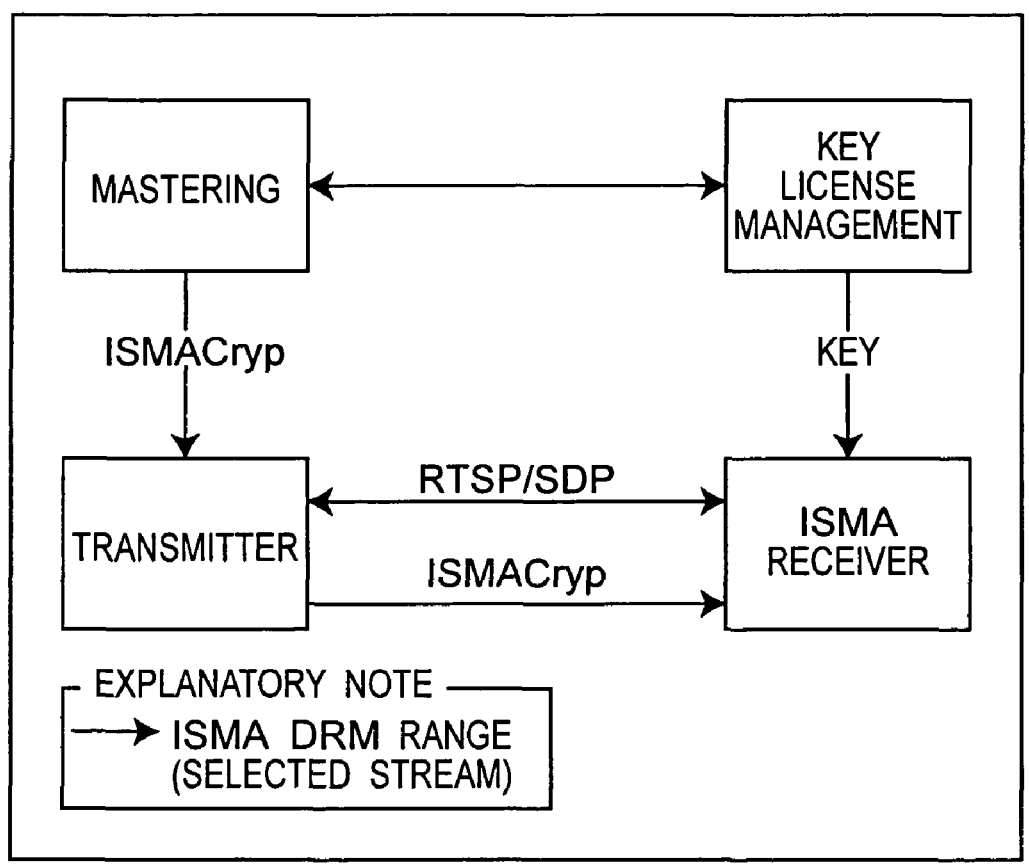
FIG. 1 is a diagram showing an ISMA Cryp architecture.
Figure 2:
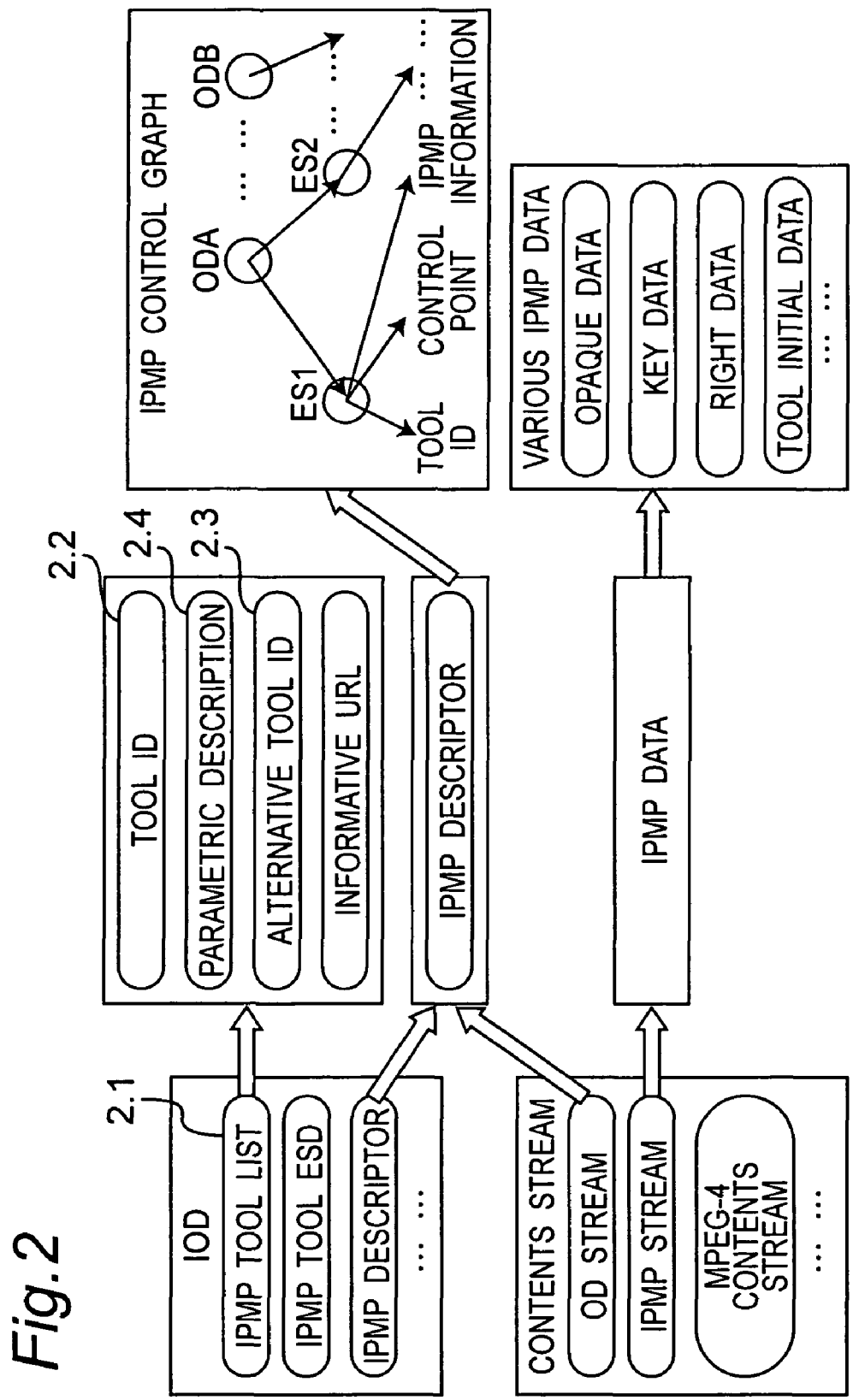
FIG. 2 is a diagram showing a structure of the MPEG-4 IPMP extension contents.

An IPMP tool list is shown in the contents structure of MPEG-4 IPMP extension shown in FIG. 2. Use of an IPMP tool list (2.1) not only makes notification of the presence of ISMA Cryp protection easy, but also gives great flexibility when a tool is specified. The IPMP tool in the tool list is specified by three methods. The first method is to use a fixed 128-bit IPMP tool ID (2.2) (value allocated by registration certification organization). The second method is to use a list of IPMP tool IDs representing alternative tools (2.3) which are equivalent to each other. In this manner, a terminal has greater flexibility when the terminal selects a tool of the terminal. The final method is to use a parametric description (2.4) which describes standards which must be satisfied by the IPMP tool. In this case, the terminal can have a higher degree of freedom when a tool for realizing a necessary function.

Basic IPMP-X Signaling

With respect to an MPEG system-capable receiver, a larger number of pieces of IPMP information is required to perform processing related to the IPMP. With respect to MPEG IPMP extension signaling having a higher ability to respond, the following IPMP signaling must be adopted as a basis. The IPMP signaling provides base information required by an MPEG compatible receiver together with a tool list described in Section 2. For an encrypted elementary stream, the pieces of information corresponding to an ES descriptor must include an IPMP descriptor pointer as shown in the following Table 2.

TABLE 2

| | | Descriptor | |
|---|---|---|---|
| Field number | Size (bit) | Field name | Value |
| | | IPMP_DescriptorPointer | |
| 1 | 8 | IPMP_DescriptorPointer tag | 10 |
| 2 | 8 | descriptor size | 5 |
| 3 | 8 | IPMP_DescriptorID | 0xFF |
| 4 | 16 | IPMPX_DescriptorID | 0x0002/0x0003 |
| 5 | 16 | IPMP_ES_ID | 0x0000 |

Figure 3:
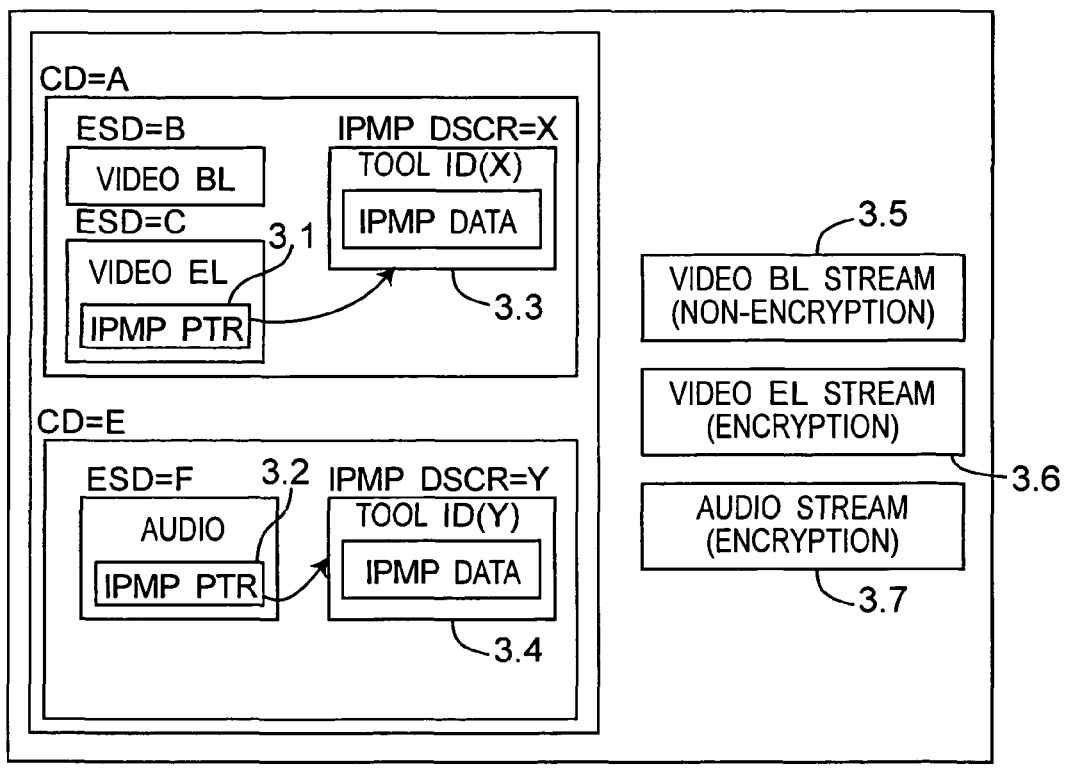
FIG. 3 is a block diagram showing a structure of a stream including contents protected by IPMP by using an IPMP descriptor.

The concept of the IPMP extension protection signaling is shown in FIG. 3. The presence of the descriptor pointer (3.1, 3.2) in the ES descriptor indicates that a stream related to the descriptor is protected and managed by an IPMP tool regulated by a referred IPMP descriptor (3.3, 3.4). The referred IPMP descriptor must be stored in object descriptors shown in the following Table 3.

TABLE 3

| | | Descriptor name | |
|---|---|---|---|
| Field number | Size (bit) | Field name | Value |
| | | IPMP_Descriptor | |
| 1 | 8 | IPMP_Descriptor tag | 11 |
| 2 | 8 | descriptor size | 23 |
| 3 | 8 | IPMP_DescriptorID | 0xFF |
| 4 | 16 | IPMPS_Type | 0xFFFF |
| 5 | 16 | IPMP_DescriptorIDEx | 0x0002/0x0003 |
| 6 | 128 | IPMP_ToolID | Value allocated to ISMA decryption tool |
| 7 | 8 | ControlPointCode | 0x01 (between decode buffer and decoder) |
| 8 | 8 | SequenceCode | 0x80 |

The IOD must include the following IPMP descriptor pointer. In an example in the following Table 4, a special DRM tool (for example, Key Management System Tool) shown in a referred descriptor must be instantiated in an entire range. The key management system tool is a tool which generates/updates/discontinues an encryption key for protecting contents and conforms to methods respectively determined for contents protection schemes.

TABLE 4

| | | Descriptor name | |
|---|---|---|---|
| Field number | Size (bit) | Field name | Value |
| | | IPMP_DescriptorPointer | |
| 1 | 8 | IPMP_DescriptorPointer tag | 10 |
| 2 | 8 | descriptor size | 5 |
| 3 | 8 | IPMP_DescriptorID | 0xFF |
| 4 | 16 | IPMP_DescriptorIDEx | 0x0001 |
| 5 | 16 | IPMP_ES_ID | 0x0000 |

The IPMP descriptor pointer indicates an IPMP descriptor in which IPMP_DescriptorIDEx is 0x0001. The regulated IPMP descriptor must be present in an IOD. With reference to a KMS, a control pointer of a descriptor must be set at 0x00 representing an entire range.

TABLE 5

| Field number | Size (bit) | Field name | Value |
|---|---|---|---|
| | | Descriptor name | |
| | | IPMP_DescriptorPointer | |
| 1 | 8 | IPMP_DescriptorPointer tag | 10 |
| 2 | 8 | descriptor size | 5 |
| 3 | 8 | IPMP_DescriptorID | 0xFF |
| 4 | 16 | IPMP_DescriptorIDEx | 0x0001 |
| 5 | 16 | IPMP_ES_ID | 0x0000 |

2. Storage of ISMA Cryp in IPMP Extension Compatible Method

An ISMA Cryp uses a pair of parameters for describing encryption of a stream. In order to convey the stored parameters by an IPMP extension compatible method, ISMA Cryp_Data is extended from IPMP-X defined in IPMP_Data_Base Class. The IPMP_Data_Base Class is defined by MPEG-4 IPMPX as follows.
abstract aligned(8) expandable(228-1) class IPMP_Data_Base Class:
bit(8) tag=0.. 255
{
bit(8) Version;
bit(32) data ID;
//Fields and data extending this message.
}

The ISMA Cryp_Data can be extended from the above base class by using a tag which is not defined by a user. Data can have a pair of fields of the data for conveying parameters. In this manner, interavailability between different ISMA terminals which interpret the same contents stream is ensured.

The ISMA Cryp_Data can be stored at two places in a standard method. The first method is a method of storing data in the IPMP descriptor. An example of an IPMP descriptor having ISMA Cryp_Data will be described in the following Table 6.

TABLE 6

| Field number | Size (bit) | Field name | Value |
|---|---|---|---|
| | | Descriptor name | |
| | | IPMP_Descriptor | |
| 1 | 8 | IPMP_DescriptorPointer tag | 11 |
| 2 | 8 | descriptor size | 23 |
| 3 | 8 | IPMP_DescriptorID | 0xFF |
| 4 | 16 | IPMP_Type | 0xFFF |
| 5 | 16 | IPMP_DescriptorIDEx | 0x0002/0x0003 |
| 6 | 128 | IPMP_ToolID | Value allocated to ISMA decryption tool |
| 7 | 8 | ControlPointCode | 0x01 (between decode buffer and decoder) |
| 8 | 8 | SequenceCode | 0x80 |
| | | ISMACryp_Data | |
| 7 | 8 | ISMACryp_DataTag | Necessary definition |
| 8 | 8 | data size | 20 |
| 9 | 8 | Cipher-suite | Encryption identifier |
| 11 | 4 | IV-length | Byte length of initial vector |
| 12 | 2 | Delta-IV-length | Byte length of initial vector based on AU |
| 13 | 1 | Selective-encryption | 1 (when selective encryption is used) |
| 14 | 1 | Key-indicator-per-Au | 1 (when pieces of key designation information appear in 1 packet) |

TABLE 6-continued

| Field number | Size (bit) | Field name | Value |
|---|---|---|---|
| | | Descriptor name | |
| 15 | 8 | Key-indicator-length | Byte length of key designation information |

The second method of storing ISMA Cryp_Data is a method of storing the data in an IPMP message (IPMP_Message) as a payload. The IPMP message is substantially stored in an IPMP stream defined in MPEG-4 IPMP extension.
aligned(8) expandable(228-1) class IPMP_Message

```
aligned(8) expandable(228-1) class IPMP_Message
{
    bit8(16)   IPMPS_Type;
    if (IPMPS_Type ==0)
    (
        bit(8) URLString[size0fInstance−2];
    )
    else (if (IPMPS_Type == 0x0001)
    (
        bit(16) IPMP_DescriptorID;
            IPMP_Data_BaseClass IPMP_ExtendedData[ ]
    } else {
        bit(8) IPMP_data[size0fInstance−2];
    }
}
```

An example in the following Table 7 represents a grammar of an IPMP message when the IPMP message stores ISMA Cryp_Data. An IPMP tool regulated in an IPMP descriptor having IPMP_DescriptorIDEz is an object of the IPMP message.

TABLE 7

| Field number | Size (bit) | Field name | Value |
|---|---|---|---|
| | | IPMP_Message | |
| 1 | 16 | message size | |
| 2 | 16 | IPMPS_Type | 0x0001 |
| 3 | 16 | IPMP_DescriptorIDEx | |
| | | ISMACryp_Data | |
| 4 | 8 | ISMACryp_DataTag | Necessary definition |
| 5 | 8 | data size | 20 |
| 6 | 8 | Cipher-suite | Encryption identifier |
| 7 | 4 | IV-length | Byte length of initial vector |
| 8 | 2 | Delta-IV-length | Byte length of initial vector based on AU |
| 9 | 1 | Selective-encryption | 1 (when selective encryption is used) |
| 10 | 1 | Key-indicator-per-Au | 1 (when pieces of key designation information appear in 1 packet) |
| 11 | 8 | Key-indicator-length | Byte length of key designation information |

FIG. 4(*a*) is a schematic diagram showing a structure of the ISMA media stream shown in FIG. 3, and FIG. 4(*b*) is an enlarged schematic diagram showing a detailed structure of an IOD and an ES descriptor in FIG. 4(*a*). In the ISMA media stream has an ISMA header and includes contents as payloads 3.5, 3.6, and 3.7. As shown in FIG. 4(*b*), IPMP descriptors 3.3 and 3.4 are expressed in the ES descriptor of the IOD, and the IPMP descriptors 3.3 and 3.4 are referred by IPMP descriptor pointers 3.1 and 3.2, respectively. Each of the IPMP descriptors 3.3 and 3.4 include an IPMP tool list descriptor. In the IPMP tool list descriptor, a tool ID for identifying, as a tool required for processing of each contents, at least one tool selected from a group including an IPMP tool, an ISMA Cryp decryption tool, and a key management system tool.

FIG. 5 is a schematic diagram showing a structure of an ISMA stream which includes an IPMP descriptor but does not include an IPMP descriptor pointer. In the ISMA media stream, a tool ID for specifying a tool used in processing of each of contents is represented in an IPMP tool list descriptor in an IPMP descriptor.

Figure 6:
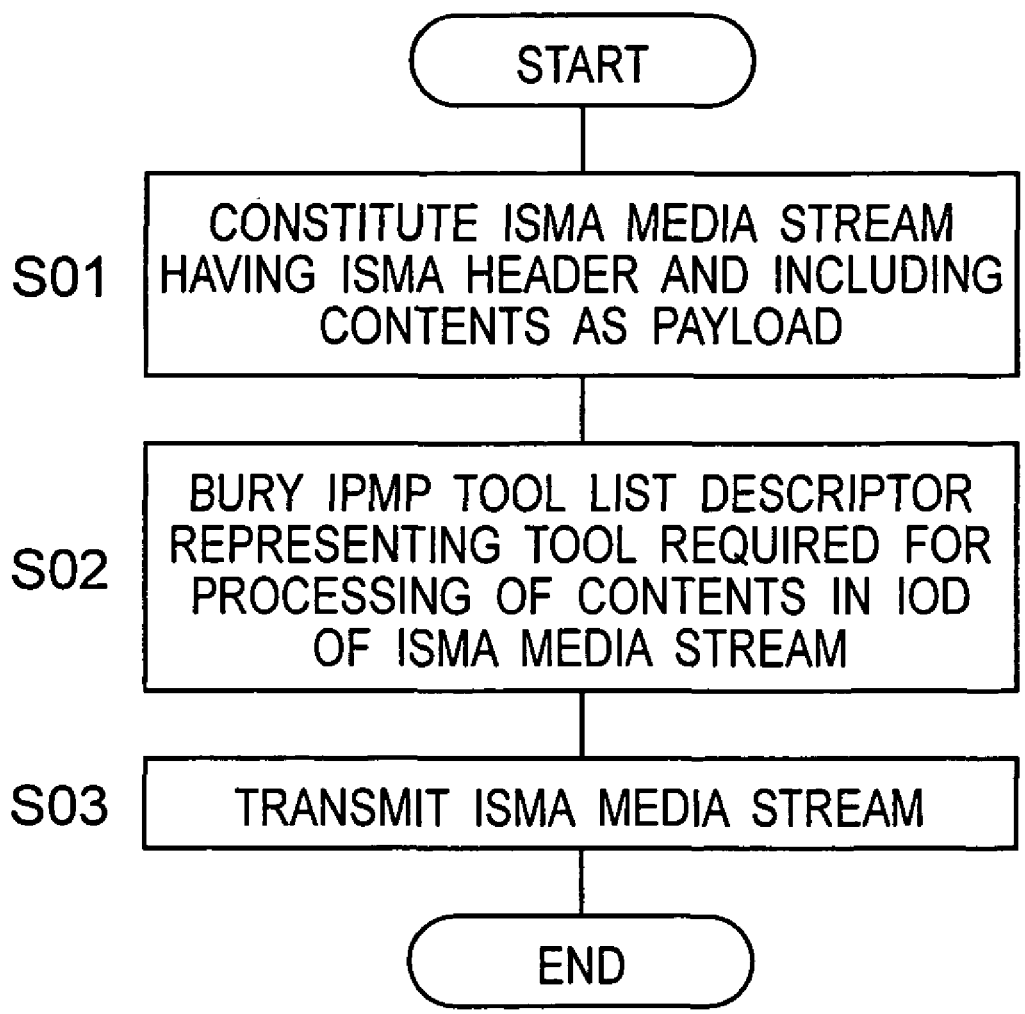
FIG. 6 is a flow chart showing a first processing method of an ISMA media stream transmitted by processing an ISMA media stream on an encoder side.

FIG. 6 is a flow chart showing a first processing method of an ISMA media stream on a transmitter (encoder) side. The first processing method of the ISMA media stream on the transmitter side will be described below.

(a) Constitute an ISMA media stream having an ISMA header and having contents as a payload (S01).

(b) Bury an IPMP tool list descriptor representing, as a tool required for processing of each contents, at least one tool selected from a group including an IPMP tool, an ISMA Cryp decryption tool, and a key management system tool in an IOD of an ISMA media stream (S02). More specifically, a tool ID is described in the IPMP tool list descriptor.

(c) Transmit an ISMA media stream (S03).

Figure 7:
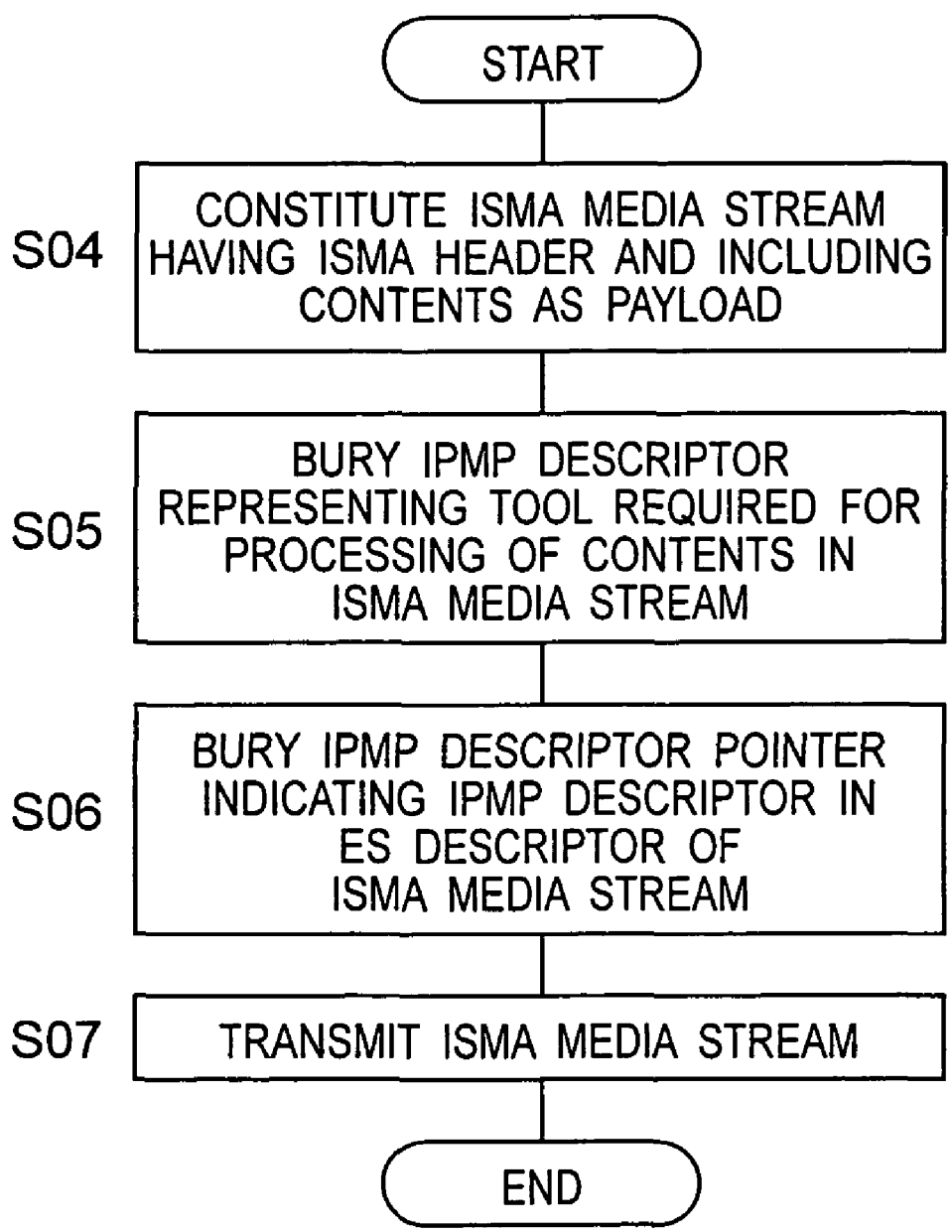
FIG. 7 is a flow chart showing a second processing method of an ISMA media stream transmitted by processing an ISMA media stream on an encoder side.

FIG. 7 is a flow chart showing a second processing method of an ISMA stream on a transmitter (encoder) side. The second processing method of the ISMA stream on the transmitter side will be described below.

(a) Constitute an ISMA media stream having an ISMA header and having contents as a payload (S04).

(b) Bury an IPMP descriptor representing, as a tool required for processing of each contents, at least one tool selected from a group including an IPMP tool, an ISMA Cryp decryption tool, and a key management system tool in an ISMA media stream (S04). More specifically, a tool ID is described in the IPMP descriptor.

(c) Bury an IPMP descriptor pointer indicating an IPMP descriptor in an ES descriptor of an ISMA media stream (S06).

(d) Transmit an ISMA media stream (S07).

Figure 8:
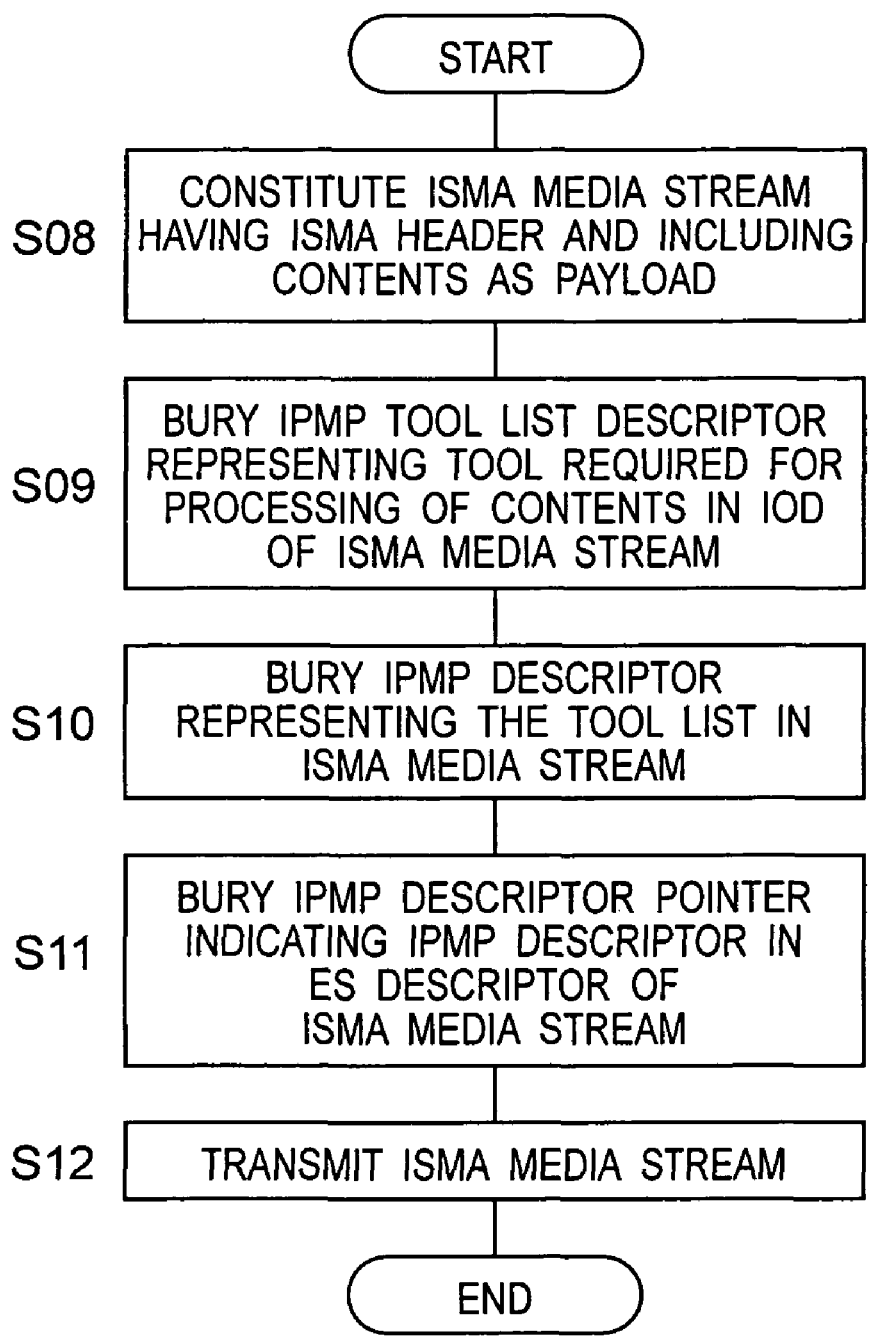
FIG. 8 is a flow chart showing a third processing method of an ISMA media stream transmitted by processing an ISMA media stream on an encoder side.

As shown in FIG. 8, in addition to the burying of the IPMP descriptor (S10), it is further preferable to further bury the IPMP tool list descriptor representing the tool in the IOD of the ISMA media stream (S09). The IPMP descriptor and the IPMP tool list descriptor representing the tools required for processing of contents are buried in the ISMA media stream to make it possible to cause the ISMA media stream to cope with various ISMA receivers.

Figure 9:
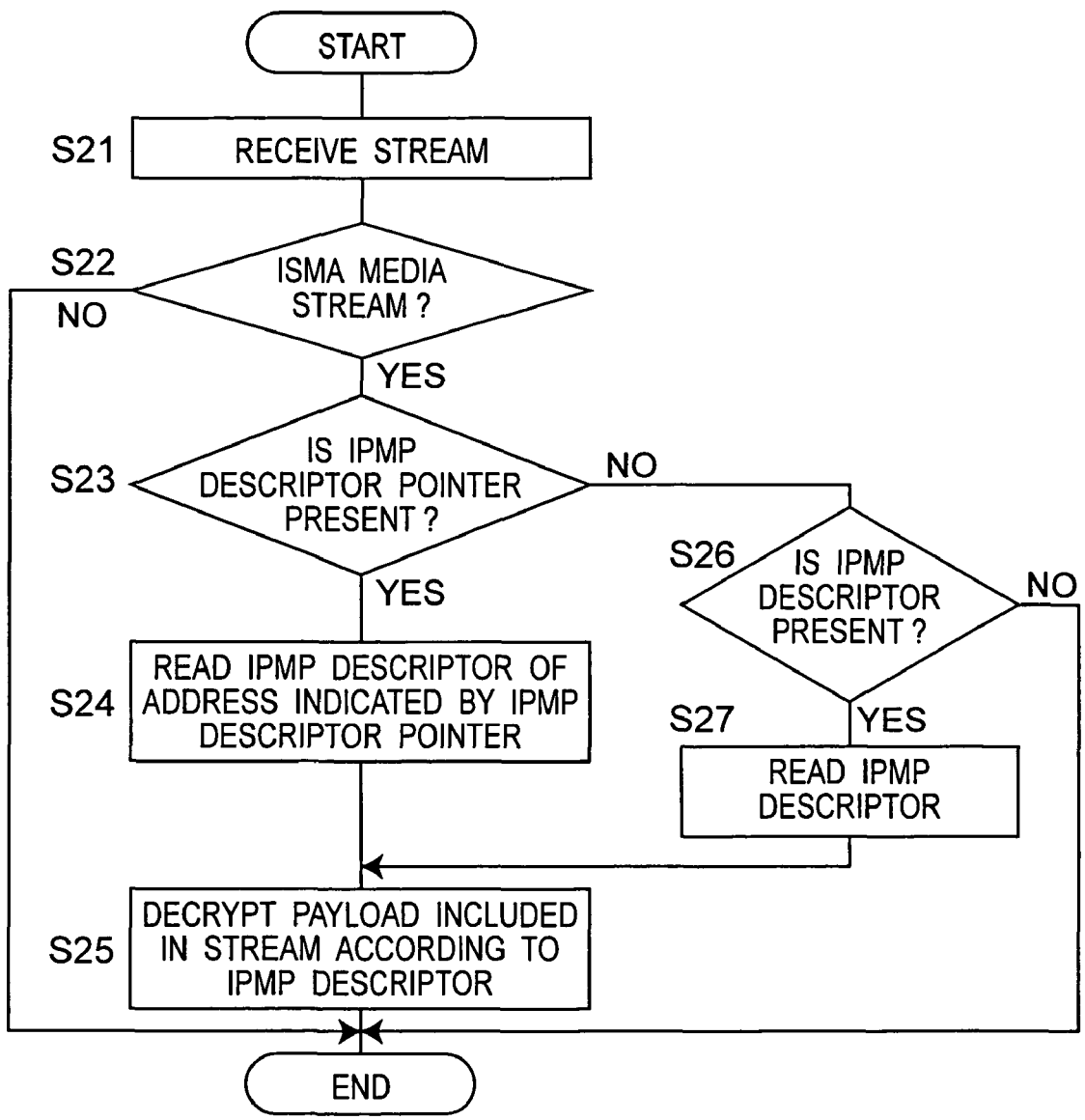
FIG. 9 is a flow chart showing a processing method for a stream received on a decoder side.

FIG. 9 is a flow chart showing a processing method for a stream received by an ISMA receiver side (decoder). The processing method for the stream on the ISMA receiver side will be described below.

(a) Receive a stream (S21).

(b) Check whether the received stream is an ISMA media stream (S22). More specifically, it is decided whether a stream is an ISMA media stream by checking whether the stream has an ISMA header. When the stream is not an ISMA media stream, the processing is directly ended.

(c) Check whether an IPMP descriptor pointer is present (S23).

(d) When the IPMP descriptor pointer is present, reads an IPMP descriptor of an address indicating the pointer (S24).

(e) Decrypt a payload (contents) included in a stream according to the IPMP descriptor (S25). For example, as shown in FIG. 4(*b*), a tool corresponding to a tool ID of a tool list described in an IPMP descriptor 3.3 indicated by an IPMP pointer 3.1 is activated to decrypt a payload C3.6.

(f) When the IPMP descriptor pointer is not present, directly read the IPMP descriptor to check whether an IPMP descriptor is present (S26). In an ISMA media stream constituted for an ISMA receiver which does not correspond to the IPMP descriptor pointer, an IPMP descriptor is arranged without arranging an IPMP descriptor pointer. Therefore, in such a case, the IPMP descriptor can be directly read. For example, in an ISMA media stream shown in FIG. 5, an IPMP descriptor pointer is not present, and a tool ID is described in an IPMP tool list descriptor in an IPMP descriptor. In this case, it is understood that a payload C (contents) is protected by reading the tool ID.

(g) When the IPMP descriptor is present, the IPMP descriptor is read (S27). Thereafter, the flow shifts to step S25. When the IPMP descriptor is not present, the processing is ended.

The present invention can adopt the following configuration described in various embodiments. According to the first configuration, there is provided a device which flexibly protects an ISMA media stream using MPEG-4 IPMP extension on an ISMA contents provider side, wherein a tool list descriptor is buried in an IOD to represent a list of IPMP tools required for processing of the contents, one of tools regulated in the tool list has a tool ID allocated to an ISMA encryption-decryption tool, one of the tools regulated in the tool list has a tool ID allocated to a key management system (KMS) tool, and the presence of any one of the two tools notifies the presence of ISMA encryption protection.

According to the second configuration, ISMA encryption protection is notified by using a tool list in an IOD, an IPMP descriptor pointer for representing that a media stream is protected is buried in an ES descriptor of the media stream, and an IPMP descriptor referred by the IPMP descriptor pointer has a tool ID of an ISMA encryption-decryption tool.

According to the third configuration, there is provided a device which flexibly protects an ISMA media stream using MPEG-4 IPMP extension on an ISMA contents provider side, wherein an ISMA Cryp parameter is stored in ISMA Cryp_Data extended from IPMP_Data_Base Class, and the ISMA Cryp_Data is stored in an IPMP descriptor substantially stored in an OD.

According to the fourth configuration, there is provided a device which flexibly protects an ISMA media stream using MPEG-4 IPMP extension on an ISMA contents provider side, wherein an ISMA Cryp parameter is stored in ISMA Cryp_Data extended from IPMP_Data_Base Class, and the ISMA Cryp_Data is stored in an IPMP_Message substantially stored in an IPMP stream.

As described above, the present invention is described in detail with reference to the preferable embodiments. The present invention is not limited to the embodiments. It will be apparent to a person skilled in the art that a large number of preferable changes and modifications can be effected within the technical range of the invention described in the following spirit and scope of the invention.

The invention claimed is:

1. A device, including a receiver, which flexibly protects an Internet Streaming Media Alliance (ISMA) media stream using Moving Picture Experts Group-4 (MPEG-4) Intellectual Property Management and Protection (IPMP) extension on an ISMA contents provider side, wherein a tool list descriptor is buried in an Initial Object Description (IOD) to represent a list of IPMP tools required for processing of the contents, one of tools regulated in the tool list has a tool ID allocated to an ISMA encryption-decryption tool, one of the tools regulated in the tool list has a tool identifier (ID) allocated to a key management system (KMS) tool, and the presence of any one of the two tools notifies the receiver of the presence of ISMA encryption protection, wherein the Tool List descriptor is read by the receiver to the tool ID, if the Tool ID is identified as either ISMA Cryp decryption tool or KMS tool to determine that the ISMA media stream is protected by ISMA Cryp protection, ISMA encryption protection is notified by using a tool list in an IOD, an IPMP descriptor pointer for representing that a media stream is protected is buried in an ES descriptor of the media stream, and an IPMP descriptor referred by the IPMP descriptor pointer has a tool ID of an ISMA encryption-decryption tool.

* * * * *

UNITED STATES PATENT AND TRADEMARK OFFICE
CERTIFICATE OF CORRECTION

PATENT NO. : 8,306,224 B2  
APPLICATION NO. : 10/555340  
DATED : November 6, 2012  
INVENTOR(S) : Ming Ji et al.

Page 1 of 1

It is certified that error appears in the above-identified patent and that said Letters Patent is hereby corrected as shown below:

On the Title Page; Page 1; (56) References Cited; Other Publications, "" ISMA – Releases Content . . . Buisness Wire" should read -- "ISMA – Releases Content . . . Business Wire --.

On the Title Page; Page 2; (56) References Cited; Other Publications, ""Internet Streaming Media Alliance Task Force: . . . Competence Center ; 650, Route Des Lucioles ; F-06921 Sophia-Antipolis Cedex ; France," should read -- "Internet Streaming Media Alliance Task Force: . . . Competence Center; 650, Route Des Lucioles; F-06921 Sophia-Antipolis Cedex; France, --.

On the Title Page; Page 2; (56) References Cited; Other Publications, "R. Koenen, Intellectual Property Management and Protection in MPEG Standards'" should read -- R. Koenen, "Intellectual Property Management and Protection in MPEG Standards" --.

In the Claims

At column 11, line 1 (claim 1, line 9) of the printed patent, "one of tools" should read -- one of the tools --.

Signed and Sealed this  
Seventh Day of May, 2013

Teresa Stanek Rea  
*Acting Director of the United States Patent and Trademark Office*